Aug. 7, 1928.
H. T. THOMAS
1,679,884
ATTACHMENT FOR DRILLS
Filed Oct. 22, 1926
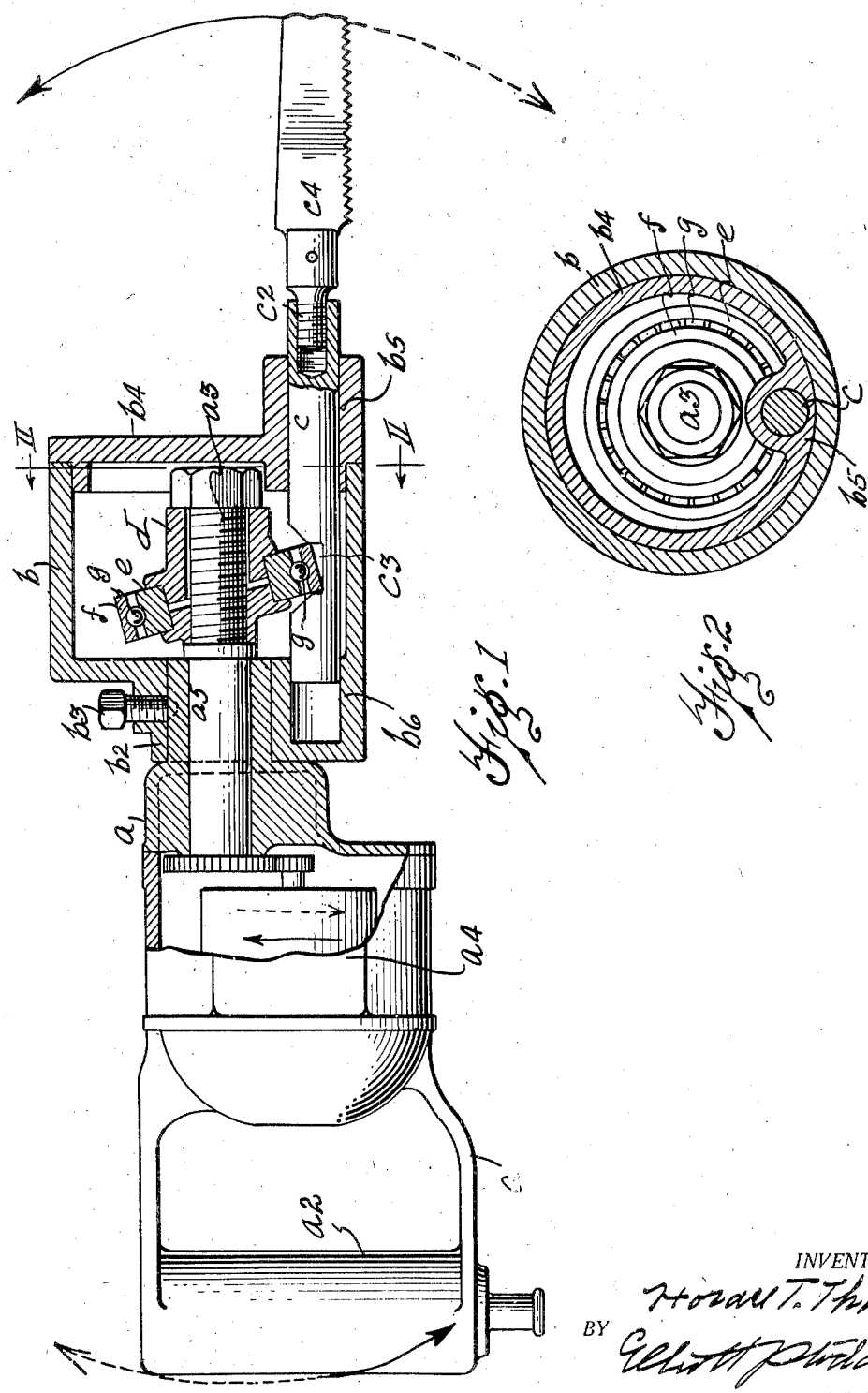
INVENTOR.
Horace T. Thomas
BY
ATTORNEY.

Patented Aug. 7, 1928.

1,679,884

UNITED STATES PATENT OFFICE.

HORACE T. THOMAS, OF LANSING, MICHIGAN.

ATTACHMENT FOR DRILLS.

Application filed October 22, 1926. Serial No. 143,470.

My invention relates to an attachment for motor driven hand drills, and an object of my improvements is to provide a simple and efficient attachment that shall adapt the drill to operate a reciprocating tool.

I secure this object in the device illustrated in the accompanying drawing in which:

Figure 1 is a side elevation of an electric, or air, drill with an apparatus embodying my invention attached thereto.

Figure 2 is a section on the line II, II Figure 1.

$a, a$, indicates a conventional drill, the spindle $a^3$ of which is driven by a small motor at $a^4$ involving the rapid rotation of a considerable mass in a plane at right angles to the axis of the spindle.

$a^2$ is the handle and $a^5$, a cylindrical projection from the stationary portion, or frame, of the drill in which projection is the bearing for the spindle $a^3$.

$b$ is a casing adapted at $b^2$ to fit over the projection $a^5$ and be secured thereto as by a set screw $b^3$.

The casing $b$ encloses the outer end of the spindle $a^3$.

$b^4$ is an enclosing head, or cover, for the casing $b$. $b^5$ is a cylindrical aperture through the cover $b^4$ and $b^6$ is a similar aperture in the head of the casing $b$ axially in line with the aperture $b^5$. These two apertures form bearings for a reciprocating rod $c$ which extends from the casing $b$ at its forward end and is formed at this end, at $c^2$, to adapt it to have a reciprocating tool, such as the saw shown in the drawing, attached thereto.

$c^3$ is a transverse slot cut in the upper portion of the rod $c$.

$d$ is a sleeve fitting and secured upon the outer end of the spindle $a^3$. $e$ is a ring surrounding the sleeve $d$ and immovably secured to said ring.

There is a second sleeve fixed on the spindle $a^3$ and the ring $e$ is clamped between the inclined opposite faces of the two sleeves by a nut on the outer end of said spindle, whereby the ring may be easily removed and replaced.

The plane of the ring $e$ is not at right angles to the axis of the sleeve $d$ and spindle $a^3$ but is considerably inclined thereto. Said ring is provided with a ball race around its periphery. $f$ is a second ring surrounding the ring $e$ and provided with a ball race around its interior surface. $g$ indicates the balls engaging in said races in the rings $e$ and $f$ and securing said rings together concentric with each other. The ring $f$ engages at its lower portion in the slot $c^3$ in the rod $c$.

The operation of the above described device is as follows:

A tool adapted to be operated by reciprocation is secured to the outer end of the rod $c$ and the motor is set in motion revolving the spindle $a^3$ which carries with it the sleeve $d$ and ring $e$. The ring $e$ acts through the balls $g$ and ring $f$ as a cam, or wobble plate, upon the walls of the slot $c^3$ to reciprocate the rod $c$ and tool $c^4$.

The apparatus described may be readily adjusted to drills of conventional construction and the whole apparatus may be fixed to a stationary support or may be carried to the work.

The inertia of the whole tool and that of the rotating armature, or motor, holds the body of the tool stationary and throws the reciprocatory motion to the cutting tool.

What I claim is:

1. The combination of a portable apparatus of the kind described having a spindle and means for rotating the same, a part adapted to carry a tool and reciprocate in the direction of the axis of said spindle, a wobble-plate on said spindle, a ring surrounding said plate, a friction bearing between said ring and plate, said ring engaging said part to reciprocate the same.

2. The combination with a portable apparatus of the kind described having a spindle and means for rotating the same, a housing adapted to be removably secured to said apparatus with said spindle extending through its wall, a tool bearing part adapted to reciprocate in bearings in said housing in a direction parallel to said spindle and located at one side of said spindle and a wobble-plate adapted to be removably secured to said spindle with its hub passing over the same within said housing, and to engage said part to reciprocate the same.

3. The combination with a portable apparatus of the kind described having a rotating part, of a part on said drill adapted to reciprocate in a line parallel to, and at one side of, the axis of said rotating part, and means whereby the rotation of said rotating part shall reciprocate said reciprocating part said rotating part having sufficient rotational momentum to substantially absorb the torques due to the momentum of the reciprocating part.

4. The combination with a portable apparatus of the kind described having a rotating part, of a part on said drill adapted to reciprocate in a line parallel to, and at one side of, the axis of said rotating part, and a cam on said spindle adapted to engage said reciprocating part, said rotating part having sufficient rotational momentum to substantially absorb the torques due to the momentum of the reciprocating part.

5. In an apparatus of the kind described, the spindle $a^3$, two sleeves adapted to be removably adjusted upon said spindle and having their adjacent end surfaces parallel and inclined to the axis of said spindle and a ring $e$ between the adjacent ends of said sleeves for the purpose described and means for forcing said sleeves together to clamp said ring between the adjacent ends of said sleeves.

In testimony whereof, I sign this specification.

HORACE T. THOMAS.